United States Patent
Otsuka et al.

(10) Patent No.: US 7,954,340 B2
(45) Date of Patent: *Jun. 7, 2011

(54) SYNTHETIC QUARTZ GLASS SUBSTRATE FOR EXCIMER LASERS AND MAKING METHOD

(75) Inventors: Hisatoshi Otsuka, Joetsu (JP); Kazuo Shirota, Joetsu (JP); Osamu Sekizawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/417,466

(22) Filed: Apr. 2, 2009

(65) Prior Publication Data

US 2009/0188281 A1    Jul. 30, 2009

Related U.S. Application Data

(62) Division of application No. 11/501,887, filed on Aug. 10, 2006, now abandoned.

(30) Foreign Application Priority Data

Aug. 11, 2005 (JP) ................. 2005-232852

(51) Int. Cl.
*C03C 19/00* (2006.01)
(52) U.S. Cl. .......... 65/70; 65/93; 65/104; 65/111; 65/112; 65/114; 65/414; 65/117
(58) Field of Classification Search .......... 65/104, 65/117, 414, 410, 64, 70, 93, 111, 112, 113, 65/114, 416; 501/54
See application file for complete search history.

(56) References Cited

U.S. PATENT DOCUMENTS

| | | | | |
|---|---|---|---|---|
| 5,364,433 A | * | 11/1994 | Nishimura et al. | 65/17.4 |
| 5,523,266 A | * | 6/1996 | Nishimura et al. | 501/54 |
| 5,703,712 A | * | 12/1997 | Komine et al. | 359/350 |
| 6,508,084 B1 | * | 1/2003 | Yokota et al. | 65/424 |
| 6,578,382 B2 | * | 6/2003 | Ueda et al. | 65/30.1 |
| 2003/0064877 A1 | | 4/2003 | Domey et al. | |
| 2003/0136153 A1 | | 7/2003 | Marley et al. | |

(Continued)

FOREIGN PATENT DOCUMENTS

EP    0 636 586 A1    2/1995

(Continued)

OTHER PUBLICATIONS

Khotimchenko et al., Zhumal Prinklandnoi Spektroskipii, pp. 987-991, vol. 46, No. 6.

*Primary Examiner* — Khanh Nguyen
*Assistant Examiner* — Keith T Aziz
(74) *Attorney, Agent, or Firm* — Birch, Stewart, Kolasch & Birch, LLP

(57) ABSTRACT

When a synthetic quartz glass substrate is prepared from a synthetic quartz glass block, (I) the block has a hydrogen molecule concentration of $5\times10^{17}$-$1\times10^{19}$ molecules/cm³, (II) the substrate has a hydrogen molecule concentration of $5\times10^{15}$-$5\times10^{17}$ molecules/cm³, (III) the substrate has an in-plane variation of its internal transmittance at 193.4 nm which is up to 0.2%, and (IV) the substrate has an internal transmittance of at least 99.6% at 193.4 nm. The synthetic quartz glass substrate has a high transmittance and a uniform transmittance distribution, and is adapted for use with excimer lasers, particularly ArF excimer lasers.

4 Claims, 1 Drawing Sheet

U.S. PATENT DOCUMENTS

2003/0195107 A1* 10/2003 Ikuta et al. .................. 501/57
2004/0162211 A1    8/2004 Domey et al.
2005/0132749 A1*  6/2005 Otsuka et al. ................ 65/17.4
2006/0137398 A1*  6/2006 Bleaking et al. ............. 65/17.3

FOREIGN PATENT DOCUMENTS

| | | |
|---|---|---|
| EP | 0 972 753 A2 | 1/2000 |
| EP | 0 985 643 A2 | 3/2000 |
| EP | 1 033 350 A1 | 9/2000 |
| EP | 1 036 772 A2 | 9/2000 |
| EP | 1033350 A1 * | 9/2000 |
| EP | 1 491 513 A1 | 12/2004 |
| JP | 1-212247 A | 8/1989 |
| JP | 7-43891 | 2/1995 |
| JP | 7-61823 A | 3/1995 |
| JP | 2762188 B2 | 3/1998 |
| WO | WO-97/16382 A1 | 5/1997 |

* cited by examiner

SYNTHETIC QUARTZ GLASS SUBSTRATE FOR EXCIMER LASERS AND MAKING METHOD

CROSS-REFERENCE TO RELATED APPLICATION

This application is a Divisional of co-pending application Ser. No. 11/501,887, filed on Aug. 10, 2006, the entire contents of which are hereby incorporated by reference and for which priority is claimed under 35 U.S.C. §120. Application Ser. No. 11/501,887 claims priority under 35 U.S.C. §119(a) on Patent Application No. 2005-232852 filed in Japan on Aug. 11, 2005, the entire contents of which are hereby incorporated by reference.

TECHNICAL FIELD

The present invention relates to synthetic quartz glass substrates having a high light transmittance, transmittance uniformity, a low birefringence, and a minimized change or uniform distribution of light transmittance during use and adapted for use with excimer lasers, and particularly ArF excimer lasers, and even as reticles in the ArF immersion lithography or the like.

BACKGROUND ART

Higher levels of integration in VLSI circuits have led to exposure patterns of increasingly small linewidth. This has created a need for exposure light sources of shorter wavelength in the lithography systems or steppers used to write circuit patterns on semiconductor wafers. The i-line (wavelength, 365 nm), once the light source of choice in lithography steppers, has been largely supplanted by the KrF excimer laser (248 nm), and today ArF excimer lasers (193 nm) are starting to see industrial use. Also for providing higher NA, the introduction of the immersion lithography is under investigation.

In unison with the development of light sources with shorter wavelength and lenses with increased NA, there exists a need for higher precision not only in the optical components (e.g., lenses, windows, prisms) used in exposure tools, but also in the photomask-forming synthetic quartz mask substrates, known as reticles, serving as the IC circuit pattern master. With respect to the ArF excimer laser, in particular, many important problems remain unsolved including high UV transmittance and high transmittance uniformity as is the case with optical components, as well as stability and uniformity of transmittance to excimer laser radiation, and even a reduction of birefringence depending on the future potential exposure system.

Two methods are commonly used for making synthetic quartz glass ingots from which synthetic quartz glass substrates are made. In a direct method, a silica-forming raw material is flame hydrolyzed, forming fine particles of silica which are then melted and deposited to effect growth. In a soot method, a silica-forming raw material is flame hydrolyzed, forming fine particles of silica which are deposited to effect growth, then later vitrified to form clear glass.

In these methods, measures are usually taken to avoid incorporation of metal impurities which can cause ultraviolet absorption. In the direct method, for example, a vapor of a high purity silane or silicone compound, typically silicon tetrachloride is directly introduced into the oxyhydrogen flame. It is subjected to flame hydrolysis to form silica fine particles, which are deposited directly on a rotating heat resistant substrate of quartz glass or the like, where the material is melted and vitrified into a transparent synthetic quartz glass.

The transparent synthetic quartz glass prepared in this way exhibits a good light transmittance even in the short wavelength region down to about 190 nm. It is thus used as transmissive material with respect to ultraviolet laser radiation, specifically i-line, excimer laser beams such as KrF (248 nm), XeCl (308 nm), XeBr (282 nm), XeF (351 nm, 353 nm), and ArF (193 nm), and the 4-fold harmonic (250 nm) of YAG.

The most important transmittance to UV light is the transmittance to the 193.4 nm wavelength light in the case of an ArF excimer laser. The transmittance of quartz glass to light at this wavelength region decreases as the content of impurities rises. Typical impurities include alkali metals such as sodium, and other metallic elements such as copper and iron. If the silane or silicone starting material used to produce synthetic quart glass is of very high purity, the concentration of such metallic impurities present within the quartz glass can be brought down to below the level of detection by a high sensitivity detector (<1 ppb). However, because sodium and copper have relatively high coefficients of diffusion into synthetic quartz glass, such impurities of the external origin can often diffuse and admix in during heat treatment. Special care must be taken to avoid such contamination during these treatment operations.

Besides the impurities discussed above, intrinsic defects present in synthetic quartz glass are known to have impact on the transmittance. The intrinsic defects are characterized by too much or too little oxygen for the Si—O—Si structure making up the synthetic quartz glass. Well-known examples include oxygen deficient defects (Si—Si, which absorbs at 245 nm) and oxygen surplus defects (Si—O—O—Si, which absorbs at 177 nm). However, such defects, or at least those which are measurable by spectrophotometry, are excluded from synthetic quartz glass for UV application to begin with. Of greater concern are more subtle defects, such as those of excessively stretched or compressed Si—O—Si bonds and those in which the Si—O—Si bond angle falls outside the stability range.

Such subtle defects are said to cause minute absorption in the UV region of wavelength 200 nm or shorter. It is believed that these defects result from some factors involved in the synthetic quartz glass manufacturing method. In the direct method described above, for example, a synthetic quartz glass ingot prepared thereby has a subtle difference in transmittance between center and peripheral portions, as analyzed in a plane perpendicular to the growth direction, typically a difference of about 0.5% at the wavelength 193.4 nm of ArF excimer laser. This transmittance difference is believed attributable to a temperature distribution in the silica growth/fusion face. It is believed that the peripheral portion assumes a subtle unstable structure due to a lower surface temperature at the peripheral portion than at the central portion and thus has a lower UV transmittance.

To remove such unstable structures, JP-A 7-61823 discloses a process in which the growth rate of quartz glass produced by the direct method is held at or below a level of 2 mm per hour. Although this process does appear to work, its very slow growth rate leads to poor productivity and an economical problem.

As effective means for improving the UV transmittance of synthetic quartz glass ingots, Japanese Patent No. 2762188 discloses that the absorption of light at wavelength 200 nm or shorter due to the contamination of synthetic quartz glass blocks during heat treatment is eliminated by irradiating UV radiation of wavelength in the range of 150 to 300 nm, desirably 180 to 255 nm.

Like the UV transmittance, stability of synthetic quartz glass to excimer laser irradiation is also important. The stability is a very important factor particularly in the case of ArF excimer laser because the ArF excimer laser reportedly causes five times more damage than a KrF excimer laser.

When synthetic quartz glass is irradiated with ArF excimer laser light, there arises a phenomenon that Si—O—Si bonds undergo cleavage by the very intense energy of laser light, forming the paramagnetic defects commonly known as E'centers which absorb 215 nm light. This brings a loss of transmittance at 193.4 nm to synthetic quartz glass. It is also known that another phenomenon, commonly referred to as "laser compaction," arises that a rearrangement of the network structure of quartz glass increases the glass density.

It is known that reducing the number of intrinsic defects in quartz glass and setting the hydrogen molecule concentration in quartz glass above a certain level are both highly effective for improving the stability of synthetic quartz glass to laser irradiation.

The fact that hydrogen molecules in the quartz glass inhibit damage to the glass by excimer laser irradiation is well-known in the art and has been the subject of active investigation ever since it was revealed in JP-A 1-212247.

With respect to hydrogen molecules, as disclosed in JP-A 7-43891, particularly in an accelerated irradiation test of operating ArF excimer laser at a high energy per pulse level of 100 mJ/cm$^2$, if more hydrogen molecules are present, the absorption at wavelength 193.4 nm increases at the initial irradiation stage, but mitigates during continued irradiation over a long term. Inversely, if less hydrogen molecules are present, the absorption at 193.4 nm is weak at the initial irradiation stage, but increases during continued irradiation over a long term. It is thus necessary to control as appropriate the concentration of hydrogen molecules in synthetic quartz glass.

While the direct method is designed in pursuit of productivity or intended for improved yields, some synthetic quartz glass ingots prepared thereby contain much more hydrogen molecules. This is due to the process conditions where the oxyhydrogen gas balance corresponds to an excess of hydrogen relative to the oxygen stoichiometry. These ingots are thus susceptible to increased initial absorption when irradiated with ArF excimer laser radiation.

There are two ways to include an appropriate level of hydrogen molecules in synthetic quartz glass. One method is by suitably adjusting the ratio of hydrogen, propane and oxygen used as the combustion gases during growth of a quartz glass ingot for thereby introducing hydrogen molecules into the growing ingot. This approach allows the concentration of hydrogen molecules in the synthetic quartz glass ingot to be adjusted within a range of about 0 to $2\times10^{19}$ molecules/cm$^3$.

The other method is by heat treating a synthetic quartz glass body within a hydrogen atmosphere, allowing for thermal diffusion of hydrogen molecules. This method has the advantage of possible strict control of the hydrogen molecule concentration. At the same time, it also has a number of significant disadvantages. Specifically, because it uses hydrogen gas which is flammable, there is a risk of explosion. Also, the associated equipment costs for safety and other purposes represent a substantial economic burden. In addition, heat treatment as in this case may allow impurities to diffuse into the quartz glass, which tends to lower the transmittance of the glass.

Of the current most concern in the practical use of ArF excimer laser, for example, is the suppression and uniformity of initial absorption upon laser irradiation.

Prior Art 1: JP-A 7-61823
Prior Art 2: JP Patent 2762188
Prior Art 3: JP-A 1-212247
Prior Art 4: JP-A 7-43891

DISCLOSURE OF THE INVENTION

An object of the present invention is to provide a synthetic quartz glass substrate having a high level and uniformity of UV transmittance, the stability and uniformity of transmittance upon excimer laser irradiation, and high optical homogeneity, and adapted for use with excimer lasers, and particularly as synthetic quartz mask substrates to form photomasks, also known as reticles, in the excimer laser lithography. Another object is to provide a method for preparing the same.

It has been found that when a synthetic quartz glass substrate is prepared by hot shaping a synthetic quartz glass ingot at a temperature in the range of 1700-1900° C. into a block of desired shape, annealing the synthetic quartz glass block at a temperature in the range of 1,000-1,300° C., slicing the synthetic quartz glass block as annealed into a substrate of desired thickness, and polishing the quartz glass substrate as sliced, the quality of synthetic quartz glass substrate is improved by heat treating the synthetic quartz glass substrate as sliced at a temperature in the range of 700-1,300° C. for a certain time, and then irradiating ultraviolet radiation thereto for a certain time. Specifically, the resulting synthetic quartz glass substrate satisfies the properties (I) to (IV) set forth below and is suited for use with the excimer laser, especially ArF excimer laser lithography, as a photomask-forming synthetic quartz glass substrate having an excellent transmittance and subject to little deterioration.

Accordingly, the present invention provides a synthetic quartz glass substrate for use with excimer lasers and a method for preparing the same.

In one aspect, the invention provides a synthetic quartz glass substrate for use with excimer lasers which is prepared from a synthetic quartz glass block wherein (I) the synthetic quartz glass block has a hydrogen molecule concentration of $5\times10^{17}$ to $1\times10^{19}$ molecules/cm$^3$, (II) the synthetic quartz glass substrate has a hydrogen molecule concentration of $5\times10^{15}$ to $5\times10^{17}$ molecules/cm$^3$, (III) the synthetic quartz glass substrate has an in-plane variation of its internal transmittance at wavelength 193.4 nm which is up to 0.2%, and (IV) the synthetic quartz glass substrate has an internal transmittance of at least 99.6% at wavelength 193.4 nm.

In a preferred embodiment, when ArF excimer laser radiation is irradiated at an energy density per pulse of 10 mJ/cm$^2$ and a shot number of $2\times10^6$ pulses into the surface thereof, the synthetic quartz glass substrate experiences a change of transmittance with a variation of up to 0.5%. In another preferred embodiment, the in-plane birefringence of the synthetic quartz glass substrate has a maximum of up to 2 nm/cm.

In another aspect, the invention provides a method for preparing a synthetic quartz glass substrate for use with excimer lasers, comprising the steps of (i) hot shaping a synthetic quartz glass ingot at a temperature in the range of 1700 to 1900° C. into a block of desired shape, (ii) annealing the synthetic quartz glass block at a temperature in the range of 1,000 to 1,300° C., (iii) slicing the synthetic quartz glass block as annealed into a substrate of desired thickness, and (iv) polishing the synthetic quartz glass substrate as sliced. The method further comprises the steps of heat treating the synthetic quartz glass substrate as sliced at a temperature in the range of 700 to 1,300° C. for a time, and then irradiating ultraviolet radiation thereto for a time. These steps are typically included between steps (iii) and (iv). Preferably, the synthetic quartz glass substrate as sliced has a thickness of up to 40 mm. Also preferably, the synthetic quartz glass substrate as sliced is heat treated for a time of 5 to 24 hours and then irradiated with ultraviolet radiation for a time of 12 to 60 hours.

BENEFITS OF THE INVENTION

The synthetic quartz glass substrates of the present invention have a high transmittance and a uniform transmittance distribution. They are subject to little deterioration by excimer laser irradiation. They are adapted for use with excimer lasers, particularly ArF excimer lasers, and even as synthetic quartz mask substrates to form photomasks, also known as reticles, in the ArF immersion lithography or the like.

DESCRIPTION OF THE PREFERRED EMBODIMENTS

Figure 1:
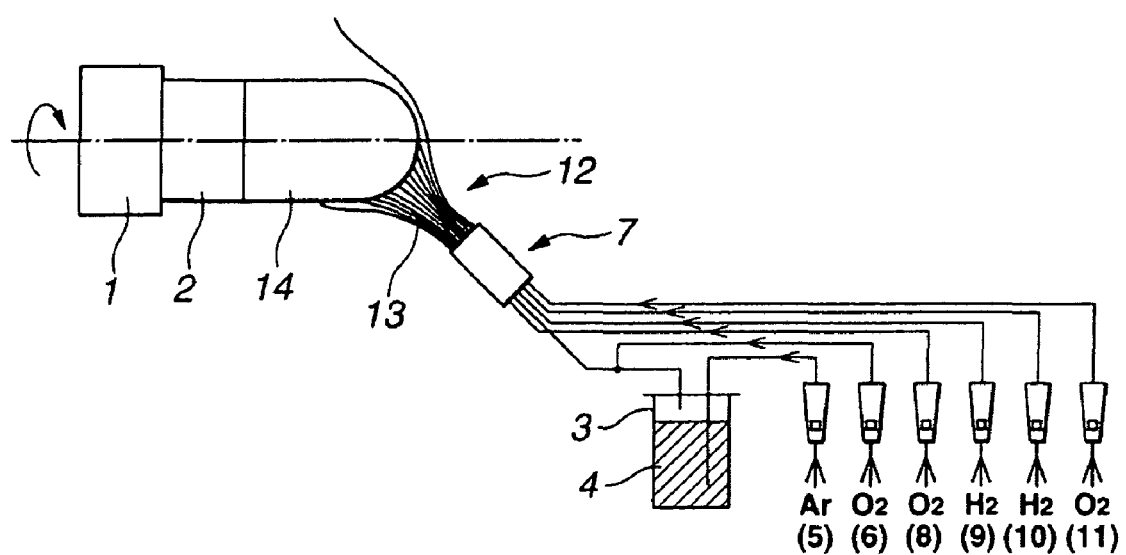
FIG. 1 is a schematic diagram showing an exemplary apparatus for producing synthetic quartz glass.

The synthetic quartz glass substrate of the invention, which is prepared from a synthetic quartz glass block, satisfies the features that:

(I) the synthetic quartz glass block has a hydrogen molecule concentration of $5\times10^{17}$ to $1\times10^{19}$ molecules/cm$^3$, (II) the synthetic quartz glass substrate has a hydrogen molecule concentration of $5\times10^{15}$ to $5\times10^{17}$ molecules/cm$^3$, (III) the synthetic quartz glass substrate has an in-plane variation of its internal transmittance at wavelength 193.4 nm which is up to 0.2%, and (IV) the synthetic quartz glass substrate has an internal transmittance of at least 99.6% at wavelength 193.4 nm.

Specifically, the synthetic quartz glass substrate of the invention for use with excimer lasers has a hydrogen molecule concentration of $5\times10^{15}$ to $5\times10^{17}$ molecules/cm$^3$, preferably $1\times10^{16}$ to $1\times10^{17}$ molecules/cm$^3$. A synthetic quartz glass substrate with a hydrogen molecule concentration of less than $5\times10^{15}$ molecules/cm$^3$ is effective in restraining the initial absorption upon ArF excimer laser irradiation, but allows the absorption to increase during long-term irradiation. A synthetic quartz glass substrate with a hydrogen molecule concentration of more than $5\times10^{17}$ molecules/cm$^3$ is ineffective in restraining the initial absorption as intended in the present invention, leading to increased initial absorption.

The synthetic quartz glass substrate has an in-plane variation of its internal transmittance at wavelength 193.4 nm which is up to 0.2%, and preferably up to 0.1%. If a substrate having a substantial transmittance distribution is used, for example, as a reticle in an optical stepper designed for a higher level of integration, trouble such as unevenness may be involved in the light exposure of the wafer. It is thus preferred that the substrate on its surface have a transmittance distribution as uniform as possible.

Likewise, the synthetic quartz glass substrate has an internal transmittance of at least 99.6% at wavelength 193.4 nm. If a quartz glass substrate with a lower internal transmittance is used as the reticle, for example, the substrate will absorb optical energy when it is transmitted by ArF excimer laser light, with the optical energy being converted into thermal energy to invite changes in the density of the synthetic quartz glass and even changes in refractive index. In an example where a synthetic quartz glass substrate with an internal transmittance of less than 99% is used as the reticle in an exposure system using an ArF excimer laser as the light source, changes in the refractive index of the reticle will cause a failure like a distortion of the image plane.

In a preferred embodiment of the synthetic quartz glass substrate, when an ArF excimer laser is operated at an energy density per pulse of 10 mJ/cm$^2$ and a shot number of $2\times10^6$ pulses to emit radiation into the surface of the synthetic quartz glass substrate, the synthetic quartz glass substrate experiences a change of transmittance with a variation of up to 0.5%. This variation of transmittance change is determined by irradiating the synthetic quartz glass substrate with ArF excimer laser radiation at an energy density per pulse of 10 mJ/cm$^2$ and a shot number of $2\times10^6$ pulses, determining a change of light absorbance at wavelength 215 nm, and calculating a transmittance change at wavelength 193.4 nm therefrom. Once the hydrogen molecule concentration in the synthetic quartz glass substrate is adjusted within the above-specified range, stabilization against excimer laser irradiation is achieved to substantially restrain a transmittance change.

In another preferred embodiment, the synthetic quartz glass substrate has a birefringence distribution which is higher in a peripheral portion than in a central portion and provides an in-plane birefringence having a maximum of up to 2 nm/cm, especially up to 1 nm/cm.

While a synthetic quartz glass block which has been hot shaped is annealed to remove any thermal strain left therein and then cooled, the birefringence within the synthetic quartz glass substrate arises from a differential cooling rate between central and peripheral portions during the cooling step. Since the cooling rate is higher in the peripheral portion than in the central portion, the peripheral portion has a broader distribution of birefringence.

In a further preferred embodiment, the synthetic quartz glass substrate has an OH content of 300 to 1,200 ppm, more preferably 400 to 800 ppm. In the case of direct method, an OH content less than 300 ppm may disturb silica growth whereas an OH content in excess of 1,200 ppm may lead to a reduced growth rate of silica, resulting in a substantial drop of productivity.

Next, the method of preparing a synthetic quartz glass substrate according to the invention is described.

Synthetic quartz glass ingots are first produced by supplying a silica-forming starting compound to an oxyhydrogen flame, subjecting the compound to vapor phase hydrolysis or oxidative decomposition in the flame to form fine particles of silica, and depositing the silica particles on a target and concurrently melting and vitrifying to form the ingot. This process is generally called direct method.

The silica-forming starting compound used in the foregoing process is a silicon compound. Preferred examples include silane compounds and siloxane compounds of general formula (1), (2) or (3) below:

Herein R$^1$, which may be the same or different, is hydrogen or monovalent aliphatic hydrocarbon groups, R$^2$ is a hydrolyzable group and n is an integer of 0 to 4.

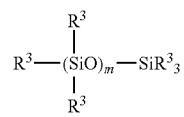

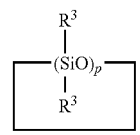

Herein R$^3$ is hydrogen or a monovalent aliphatic hydrocarbon group, m is an integer of at least 1, especially 1 or 2, and p is an integer of 3 to 5.

Illustrative examples of the monovalent aliphatic hydrocarbon groups represented by $R^1$ and $R^3$ include $C_{1-4}$ alkyls such as methyl, ethyl, propyl, n-butyl and tert-butyl; $C_{3-6}$ cycloalkyls such as cyclohexyl; and $C_{2-4}$ alkenyls such as vinyl and allyl. Examples of the hydrolyzable groups represented by $R^2$ include halogen atoms such as chlorine atom and alkoxy groups having 1 to 4 carbon atoms such as methoxy group and ethoxy group.

Specific examples of suitable silane compounds of formula (1) include $SiCl_4$, $CH_3SiCl_3$, $(CH_3)_2SiCl_2$, $Si(OCH_3)_4$, $Si(OCH_2CH_3)_4$ and $CH_3Si(OCH_3)_3$. Specific examples of suitable siloxane compounds of formula (2) or (3) include hexamethyldisiloxane, hexamethylcyclotrisiloxane, octamethylcyclotetrasiloxane and decamethylcyclopentasiloxane.

A quartz burner that forms the oxyhydrogen flame is supplied with the silane or siloxane compound starting material, a combustible gas such as hydrogen, carbon monoxide, methane or propane, and a combustion-supporting gas such as oxygen.

As is usually the case, the burner which receives these feeds including silane compound, combustible gas (e.g., hydrogen), and combustion-supporting gas (e.g., oxygen) may be a burner having at the center a multiple concentric tube, typically triple or quintuple tube. The apparatus used to produce the synthetic quartz glass ingot may have a vertical construction or a horizontal construction.

From the synthetic quartz glass ingot thus obtained, a synthetic quartz glass substrate is produced through the steps of (i) hot shaping the synthetic quartz glass ingot at a temperature in the range of 1700 to 1900° C. into a block of desired shape, (ii) annealing the synthetic quartz glass block at a temperature in the range of 1,000 to 1,300° C., (iii) slicing the synthetic quartz glass block as annealed into a substrate of desired thickness, and (iv) polishing the synthetic quartz glass substrate as sliced. At this point, the synthetic quartz glass block should have a hydrogen molecule concentration of $5 \times 10^{17}$ to $1 \times 10^{19}$ molecules/cm$^3$. The method of the invention further includes the steps of heat treating the synthetic quartz glass substrate as sliced at a temperature in the range of 700 to 1,300° C. for a time, and then irradiating ultraviolet radiation thereto for a time, whereby the desired synthetic quartz glass substrate is produced.

Specifically, the synthetic quartz glass ingot prepared as above is worked on a cylindrical grinder or the like for removing silica fines or soot deposited thereon, immersed in aqueous hydrofluoric acid for etching away contaminants on the surface, then thoroughly washed with deionized water, and dried in a clean room. Then hot shaping is carried out to form a block of desired shape. Most often, the synthetic quartz glass ingot is placed in a mold of high purity carbon material or the like in a vacuum melting furnace where the ingot is held in an inert gas atmosphere such as argon, at a slightly subatmospheric pressure and a temperature in the range of 1700 to 1900° C. for 30 to 120 minutes. In this way, the cylindrical ingot is converted into a synthetic quartz glass block.

For removing the thermal stress strain introduced by this hot shaping, the block is then annealed. Specifically, in an atmospheric pressure furnace, the block is held in air or in an inert gas atmosphere such as nitrogen at a temperature in the range of 1,000 to 1,300° C. for at least 5 hours and then slowly cooled over several hours or more to approximately the strain point temperature. The annealing is effective for suppressing the birefringence within the synthetic quartz glass block to 20 nm/cm or less. The birefringence can be reduced to a level of 2 nm/cm or less, for example, by adjusting the maximum temperature and the cooling rate until the strain point is reached.

The synthetic quartz glass block as annealed has a hydrogen molecule concentration of $5 \times 10^{17}$ to $1 \times 10^{19}$ molecules/cm$^3$, and preferably $1 \times 10^{18}$ to $1 \times 10^{19}$ molecules/cm$^3$. If the hydrogen molecule concentration is less than $5 \times 10^{17}$ molecules/cm$^3$ at this point, the subsequent heat treatment of a synthetic quartz glass substrate as sliced fails to adjust the hydrogen molecule concentration to fall within the preselected range. Above $1 \times 10^{19}$ molecules/cm$^3$, growth of such a synthetic quartz glass ingot is difficult.

It is noted that the hydrogen molecule concentration in the synthetic quartz glass ingot is adjusted by balancing the feed rates of the silica-forming starting material, combustible gas (e.g., hydrogen), and combustion-supporting gas (e.g., oxygen) used in the ingot preparation process.

The synthetic quartz glass block as annealed is ground on every surface by a surface grinding machine and finished such that opposed surfaces of each pair are parallel. The block is then sliced into a substrate and chamfered along each side.

In slicing the synthetic quartz glass block into a substrate, the substrate should preferably have a thickness of up to 40 mm, more preferably up to 10 mm. If the thickness of the sliced substrate is more than 40 mm, it may take some time to adjust the hydrogen molecule concentration in the substrate. For example, the current predominant synthetic quartz mask substrates used as the IC photomask typically have a thickness of 6.35 mm for the 6-inch square size. The original synthetic quartz glass block from which synthetic quartz glass substrates of this size are sliced generally has a thickness of at least 100 mm. When the hydrogen molecule concentration is adjusted in the synthetic quartz glass block as hot-shaped, holding at a temperature of at least 1000° C. for at least 0.5 month is still insufficient to reach a hydrogen molecule concentration within the desired range, becoming a substantial disadvantage from the standpoint of productivity. This is because the diffusion and migration of hydrogen molecules is governed by the dimensions of a synthetic quartz glass block.

The heat treatment of the synthetic quartz substrate as sliced is generally carried out in an atmospheric pressure furnace and in air or in an inert gas atmosphere of nitrogen or the like. Typically a stack of sliced substrates is placed in a high-purity quartz tube.

The heat treatment of synthetic quartz substrates as sliced may be a brief treatment at a relatively low temperature. The heat treatment temperature may be in the range of 700 to 1,300° C., preferably 800 to 900° C. At temperatures below 700° C., the heat treatment requires a longer time. Temperatures above 1,300° C. may allow for impurity contamination from within the furnace and increase the diffusion rate, rendering the adjustment of residual hydrogen molecules difficult.

Specifically, synthetic quartz substrates as sliced to a thickness equal to or less than 40 mm are stacked and placed in a cylindrical quartz tube which has been treated and cleansed in the annealing atmospheric pressure furnace. The cylindrical quartz tube at the top and bottom is closed with synthetic quartz lids. In this state, the substrates are held at a temperature in the range of 700 to 1,300° C. for a time of 5 to 24 hours, preferably 5 to 12 hours, whereby synthetic quartz glass substrates having a maximum of birefringence equal to or less than 2 nm/cm are yielded. At temperatures below 700° C., the heat treatment requires a longer time until hydrogen molecules within the synthetic quartz substrate diffuse and migrate outward. Temperatures above 1,300° C. may allow for contamination from within the furnace and increase the diffusion rate, rendering the adjustment of residual hydrogen molecules difficult.

Particularly when it is desired to have synthetic quartz glass substrates having a maximum of birefringence equal to or less than 1 nm/cm, synthetic quartz substrates as sliced to a thickness equal to or less than 40 mm are stacked and placed in a cylindrical quartz tube which has been treated and cleansed in the annealing atmospheric pressure furnace, the cylindrical quartz tube at the top and bottom is closed with synthetic quartz lids, and the substrates are held at a temperature in the range of 1,100 to 1,300° C. for a time of 5 to 24 hours, preferably 5 to 12 hours, and then cooled at a rate of 1 to 35° C./hr to a temperature of 500 to 600° C.

After the heat treatment, the synthetic quartz glass substrates are irradiated with ultraviolet radiation by any well-known technique as disclosed in Japanese Patent No. 2762188. Suitable light sources include a low pressure mercury lamp having main wavelengths 253.7 nm and 184.9 nm, a Xe excimer lamp having wavelength 172 nm, and a KrCl excimer lamp having wavelength 222 nm. The illuminance of UV radiation should be at least 1 µW/cm². The irradiation time may be about 12 to 60 hours because UV lamps generally have a short life so that many lamps must be used, increasing the running cost. Since less than 12 hours of irradiation may achieve the transmittance-improving effect to a less extent, an irradiation time of at least 12 hours is desired.

It is acceptable that UV irradiation be performed on the quartz block as hot shaped or annealed. In this case, the subsequent steps are the same as described above, except that the UV irradiation of sliced substrates is omitted.

The sliced substrates after UV irradiation are then subjected to a conventional finishing process including lapping, pre-polishing and final polishing, whereupon the target synthetic quartz glass substrates for use with excimer laser are obtained.

If necessary, for adjusting to the desired thickness, the synthetic quartz glass substrates may be again sliced or surface ground.

The synthetic quartz glass substrates thus completed are useful as synthetic quartz mask substrates to form photomasks, known as reticles, used in IC substrate fabrication in steppers.

Example

Examples of the invention are given below by way of illustration and not by way of limitation.

In the Examples, measurements of the internal transmittance, birefringence, and hydrogen molecule concentration were carried out as follows.

Internal Transmittance

Measured by ultraviolet spectrophotometry using a transmittance spectrophotometer Cary 400 by VARIAN Inc.

Birefringence

Measured using a birefringence measurement system, such as ABR-10A by Uniopt Corporation.

Hydrogen Molecule Concentration

Measured by laser Raman spectrophotometry as described in *Zhurnal Priklandnoi Spektroskopii*, Vol. 46, No. 6, 987-991 (1987). Measurement was carried out by photon counting using a spectrometer NRS-2100 by JASCO Corp. In measurement of the hydrogen molecule concentration by argon laser Raman spectrophotometry, the measured values vary with the sensitivity curve of the detector. Values must thus be calibrated using a reference sample.

Examples and Comparative Examples

A synthetic quartz glass ingot was produced by feeding 3000 g/hr of methyltrichlorosilane to a quartz burner that formed a flame from 12 Nm³/hr of oxygen and 30 Nm³/hr of hydrogen, subjecting the silane to oxidation or combustion decomposition to form fine particles of silica, then depositing the silica particles on a rotating quartz target while melting and vitrifying at the same time.

Referring to FIG. 1, a quartz glass target 2 was mounted on a rotating support 1. Argon gas 5 was introduced into the methyltrichlorosilane 4 in an evaporator 3. Methyltrichlorosilane 4 vapor was carried out of the evaporator by the argon 5, and oxygen gas 6 was added to the silane-laden argon to form a gas mixture, which was then fed to the center nozzle of a quartz burner 7. The burner 7 was also fed the following gases, in outward order from the foregoing gas mixture at the center: oxygen 8, hydrogen 9, hydrogen 10, and oxygen 11. The silane starting material and an oxyhydrogen flame 12 were discharged from the burner 7 toward the target 2. Fine particles of silica 13 were deposited on the target 2 and simultaneously melted and vitrified as clear glass, forming a synthetic quartz glass ingot 14.

During growth of the ingot, the starting material, methyltrichlorosilane was fed at a constant hourly flow rate, and the burner settings and the balance of oxygen/hydrogen gas flow rates through burner nozzles were adjusted so as to maintain the shape of the silica fusion/growth face as appropriate. The synthetic quartz glass ingot thus obtained had a diameter of 140 mm and a length of 600 mm.

The surface of this synthetic quartz glass ingot was ground by a cylindrical grinding machine for removing the non-melted silica or soot deposited thereon. For surface cleaning, the ingot was dipped in 50 wt % hydrofluoric acid solution for 5 hours, washed with deionized water, and dried in a clean room.

The synthetic quartz glass ingot as surface cleaned was placed in a carbon mold in a vacuum melting furnace where it was heated in an argon atmosphere at a temperature of 1,780° C. for 40 minutes, hot shaping into a synthetic quartz glass block. The block was annealed by holding at a temperature of 1,100° C. for 2 hours and cooling down to 950° C. at a rate of 15° C./hr. At this point, the block had dimensions of 160 mm×160 mm×350 mm long. The block also had a hydrogen molecule concentration of $4 \times 10^{18}$ molecules/cm³.

After surface conditioning, the synthetic quartz glass block was sliced into substrates having a thickness of 10 mm or 40 mm, which were chamfered. Thirty (30) synthetic quartz glass substrates as sliced were stacked and placed in a cylindrical quartz tube having an inner diameter of 240 mm which had been treated and cleansed in a furnace of the same type as the annealing furnace. The quartz tube at the top and bottom was closed with synthetic quartz lids. The synthetic quartz glass substrates as sliced were treated under the conditions shown in Table 1 for adjusting the hydrogen molecule concentration within the substrates.

Thereafter, the synthetic quartz glass substrates were exposed under low-pressure mercury lamps for 48 hours. They were lapped and polished in an ordinary way, yielding synthetic quartz glass substrates of the typical size, 6 inch square by a thickness of 6.35 mm.

A sample of 10 mm×6.35 mm×90 mm was cut out of the synthetic quartz glass substrate. Four surfaces (two 10 mm×90 mm surfaces and two 6.35 mm×90 mm surfaces) of the sample were polished. The sample was measured for a hydrogen molecule concentration and an absorbance at wavelength 215 nm through ArF excimer laser irradiation. Another sample of 30 mm square was cut out of the substrate, and measured for a transmittance of light with wavelength 193.4 nm relative to the 30 mm square surfaces. At the same time, a transmittance distribution in the substrate plane was measured. The heat treatment or dehydrogenation conditions, UV irradiation conditions and ArF excimer laser performance are shown in Table 1.

TABLE 1

| | Synthetic quartz block | Synthetic quartz glass substrate as sliced | | | | | |
|---|---|---|---|---|---|---|---|
| | | Heat treatment | | | | UV | |
| | Hydrogen molecule concentration ($\times 10^{17}$ molecules/cm$^3$) | Thickness (mm) | Temp. (° C.) | Holding time (hr) | Cooling rate (° C./hr) | irradiation Time (hr) | Hydrogen molecule concentration ($\times 10^{17}$ molecules/cm$^3$) |
| Example 1 | 40 | 10 | 800 | 12 | 50 | 12 | 0.1 |
| Example 2 | 40 | 10 | 800 | 12 | 50 | 48 | 0.1 |
| Example 3 | 40 | 10 | 800 | 8 | 50 | 24 | 0.5 |
| Example 4 | 40 | 40 | 1100 | 5 | 4 | 24 | 0.08 |
| Comparative Example 1 | 40 | 10 | 800 | 24 | 50 | 24 | <0.05 |
| Comparative Example 2 | 40 | 10 | 800 | 12 | 50 | 5 | 0.1 |

| | Synthetic quartz glass substrate of 6 inch square | | | | | | |
|---|---|---|---|---|---|---|---|
| | Internal transmittance and in-plane variation | | | Transmittance change* and in-plane variation | | | Birefringence |
| | Substrate center (%) | Substrate periphery (%) | Difference ΔT (%) | Substrate center (%) | Substrate periphery (%) | Difference ΔT (%) | Maximum (nm/cm) |
| Example 1 | 99.74 | 99.69 | 0.05 | 0.10 | 0.50 | 0.40 | 1.9 |
| Example 2 | 99.75 | 99.71 | 0.04 | 0.10 | 0.60 | 0.50 | 2.0 |
| Example 3 | 99.74 | 99.70 | 0.04 | 0.60 | 0.20 | 0.40 | 1.5 |
| Example 4 | 99.73 | 99.68 | 0.05 | 0.10 | 0.10 | 0.00 | 0.5 |
| Comparative Example 1 | 99.73 | 99.69 | 0.04 | 0.05 | 0.90 | 0.85 | 1.4 |
| Comparative Example 2 | 99.73 | 99.48 | 0.25 | 0.10 | 0.50 | 0.40 | 1.3 |

*ArF excimer laser irradiation conditions:
energy density per pulse = 10 mJ/cm$^2$
shot number = $2 \times 10^6$ pulses Japanese Patent Application No. 2005-232852 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a synthetic quartz glass substrate for use with excimer lasers, comprising the steps of:
   (i) hot shaping a synthetic quartz glass ingot at a temperature in the range of 1700 to 1900° C. into a block of desired shape;
   (ii) annealing the synthetic quartz glass block at a temperature in the range of 1,000 to 1,300° C.;
   (iii) slicing the synthetic quartz glass block as annealed into a substrate of desired thickness; and
   (iv) polishing the sliced synthetic quartz glass substrate; and
   (v) heat treating the sliced synthetic quartz glass substrate at a temperature in the range of 700 to 1,300° C. in air or in an inert gas atmosphere for a time of 5 to 12 hours, and then irradiating ultraviolet radiation thereto for a time of 12 to 60 hours.

2. The method of claim 1, wherein the synthetic quartz glass substrate as sliced has a thickness of up to 40 mm.

3. The method of claim 1, wherein the step of (v) heat treating is conducted in the inert gas atmosphere.

4. The method of claim 1, wherein the step of (v) heat treating is conducted so as to decrease hydrogen molecule concentration in the synthetic quartz glass substrate.

* * * * *